United States Patent [19]

Klee et al.

[11] Patent Number: 4,579,191
[45] Date of Patent: Apr. 1, 1986

[54] OPERATOR RESTRAINT SYSTEM

[75] Inventors: Maurice Klee; Gary L. Cochran, both of Burlington, Iowa

[73] Assignee: J. I. Case Company, Racine, Wis.

[21] Appl. No.: 668,439

[22] Filed: Nov. 5, 1984

[51] Int. Cl.⁴ ............................................ B60R 21/00
[52] U.S. Cl. ................................... 180/268; 297/488
[58] Field of Search ............... 180/268; 280/801, 802, 280/748; 297/464, 487, 488

[56] References Cited

U.S. PATENT DOCUMENTS

| | | | |
|---|---|---|---|
| 3,269,482 | 8/1966 | McCarthy, Jr. | 180/268 |
| 3,431,995 | 3/1969 | Kiernan | 180/268 |
| 3,578,382 | 5/1971 | Servadio | 297/488 |
| 3,899,042 | 8/1975 | Bonar | 297/487 |
| 4,300,788 | 11/1981 | Sperling | 280/748 |

Primary Examiner—John A. Pekar
Assistant Examiner—Ross Weaver
Attorney, Agent, or Firm—Cullen, Sloman, Cantor, Grauer, Scott & Rutherford

[57] ABSTRACT

An operator restraint system for a front end loader which requires an operator to rotate a pair of opposed restraint arms in front of him when he is seated before the loader may be operated. Each restraint arm is pivotally mounted to a cab surrounding the operator. A park latch cable is attached to each pivotal restraint arm and the cable is additionally attached to other components including a parking brake assembly and loader control lock. The restraint arms are biased to normally assume a generally vertical inoperative position which prevents operation of the loader. After the operator is seated, he rotates the restraint arms to an operative position in front of him wherein the arms are securely stationed and cannot be rotated back to their generally vertical inoperative position until the operator releases them. The loader is incapable of being operated until the restraint arms are locked into position for securing the operator in his seat.

6 Claims, 10 Drawing Figures

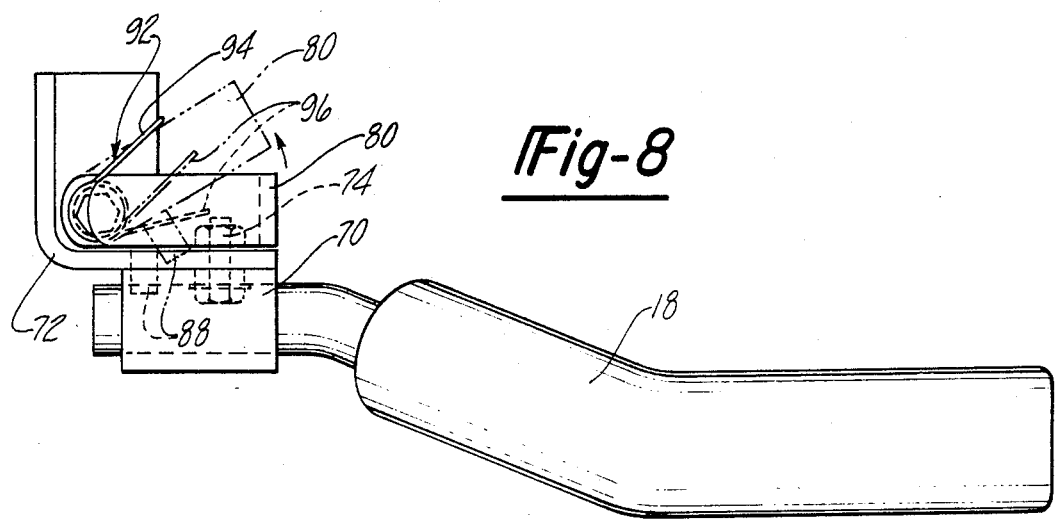
Fig-8
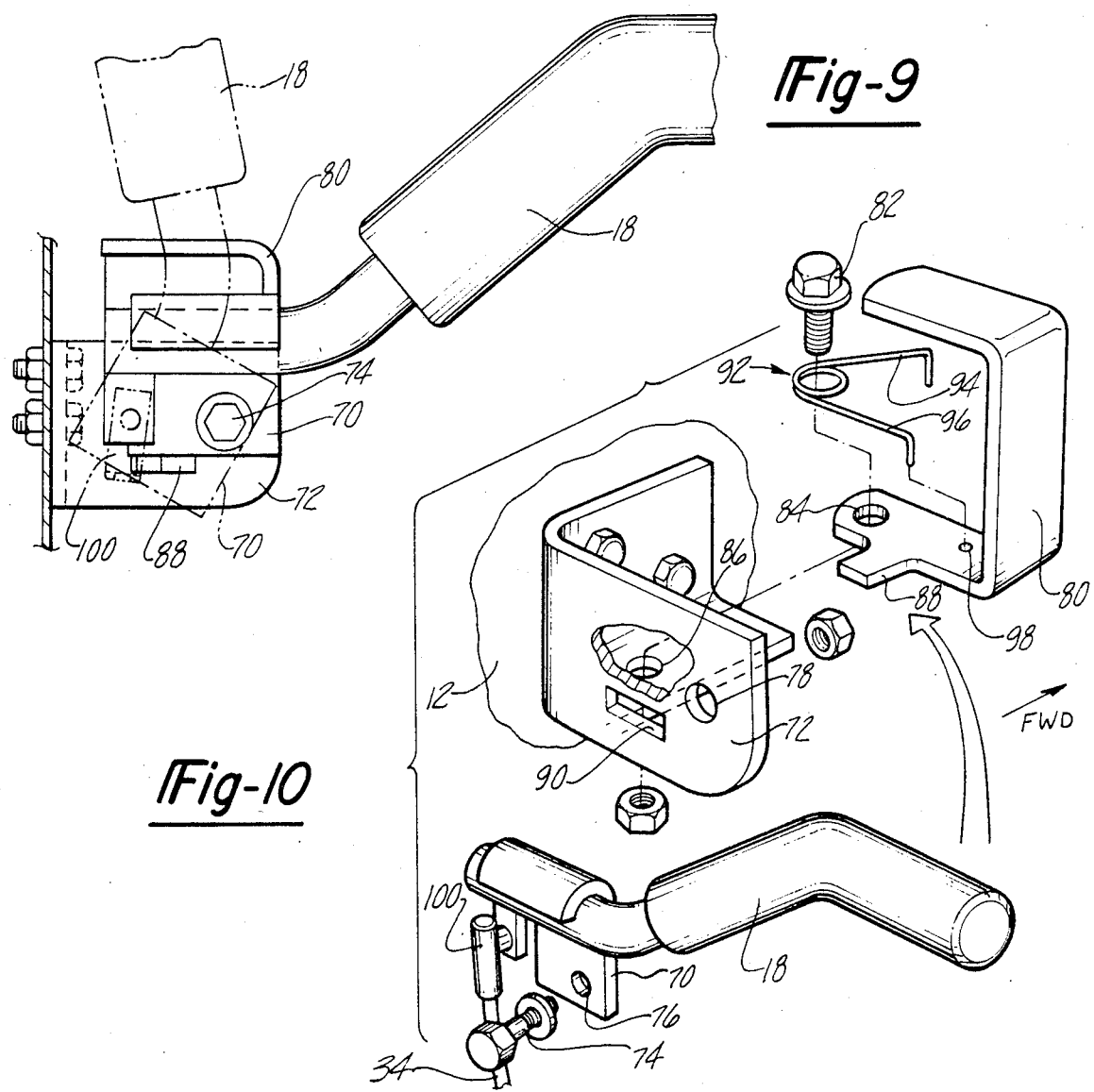
Fig-9
Fig-10

OPERATOR RESTRAINT SYSTEM

BACKGROUND OF THE INVENTION

The present invention relates to an operator restraint system for front end loaders, and more particularly, to a passive restraint assembly for securing the operator in his seat during the operation of the loader and for preventing operation of the loader unless the restraint assembly is used.

Front end loaders often include a cab portion having an operator's seat from which the loader is operated and from which the operator can control the various functions of the loader. It is conventional to provide devices such as seat belts and the like for securing an operator in his seat during machine operation. It is desirable that these devices be simple in construction and conveniently located such that the operator will use them when operating the machine.

Thus, the present invention is directed to an operator restraint system for securing the operator in his seat during the operation of the front end loader while making it impractical for the operator to subvert the purpose of using the restraint system.

SUMMARY OF THE INVENTION

The present invention is disclosed in connection with a skid steer loader which includes a roll over protection device or cab and an operator's seat that is provided inside the cab. The loader also includes control levers or handles in front of the operator's seat for permitting the operator to control the movements of the skid steer loader.

The passive restraint system disclosed herein is used to supplement the conventional seat belts in providing operator restraint. The restraint system includes as its basic component a pair of opposed pivotal restraint arms which must be pivoted downwardly to an operative position before the operator can have access to the control levers for the loader. Further, if the restraint arms are not locked into their operative or restraint position, then the operator will be unable to operate the skid steer loader. When the operator is not seated, the restraint arms assume a relatively vertical inoperative position which also prevents operation of the loader.

The operator restraint arms may be pivotally mounted in several ways. In a first arrangement, one end of each restraint arm is pivotally mounted between spaced apart brackets having elongated slots therein. The brackets are mounted to a slide plate on a cab side wall with the slide plate including an opening for receiving a tapered end of a respective restraint arm. An elongated pin is provided for pivotally securing each arm between the brackets with the pin being slidably movable along the elongated bracket slots. A park latch cable is attached to each restraint arm and tension springs are provided along the length of the park latch cable for biasing the restraint arms toward a relatively vertical inoperative position.

After the operator is seated, he pulls downwardly on the free ends of the restraint arms which causes the arms to pivot and simultaneously move linearly along the elongated slots in the brackets until the tapered ends of the restraint arms are received within the openings in the slide plates. Thereafter, the bias of the tension springs causes the restraint arms to remain securely stationed in their restraint position until the operator releases them. The arms are released by a lateral pulling action which disengages their tapered ends from the slide plate openings thereby permitting the tension springs to pivot the restraint arms back to their relatively vertical inoperative position.

The park latch cable is connected to a parking brake assembly such that when the restraint arms are in their vertical inoperative position, a parking brake is automatically engaged thereby making the loader inoperative. Thus, if the restraint arms are not locked into their restraint position, the operator will be unable to operate the loader.

In a modified arrangement for biasing the individual restraint arms, an elongated pin is provided for pivotally securing each arm between brackets having elongated slots as before. However, in this arrangement, springs are connected between the ends of the elongated pin and mounting tab portions on the slide plate for biasing the restraint arms. Thus, the spring bias on the restraint arms is provided between the slide plate and elongated pin rather than by the tension springs in the park latch cable as previously described.

Another arrangement for pivotally mounting and securing the restraint arms includes each restraint arm being pivotally secured to a bracket on the cab side wall by means of a pivot plate. A hand operated latch is also pivotally attached to the cab side wall bracket. The latch includes a projecting stop portion which is movable through an opening in the bracket for engaging the restraint arm pivot plate. Further, the latch is biased by a spring for urging the stop portion to extend through the bracket opening. A park latch cable is again connected to each pivoted restraint arm with the cable being attached to a pivotal loader control lock and to a parking brake assembly.

In operation, when the restraint arm is in a generally vertical inoperative position, the restraint arm pivot plate prevents the spring biased latch stop portion from extending through the bracket opening. After the operator is seated, he rotates the restraint arm to an operative position which permits the latch stop portion to extend through the bracket opening and into blocking engagement with an end of the restraint arm pivot plate. Thereafter, the restraint arm cannot rotate back to its generally vertical inoperative position until the hand operated latch is rotated by the operator to release the stop portion from engagement with the restraint arm pivot plate. When the latch stop portion is disengaged, the restraint arm is returned to its generally vertical inoperative position.

When the restraint arm is rotated to its operative position, the pivotal loader control lock is lifted to an "off" position which permits operation of the loader. Simultaneously, the park latch cable disengages a parking latch pin in a drive sprocket which allows the loader wheels to rotate. If the operator rotates the spring bias latch to disengage the stop portion from engagement with the restraint arm pivot plate, the restraint arm is rotated to a generally vertical inoperative position which causes the loader control lock to rotate to an "on" position and the parking latch pin to be re-engaged with the drive sprocket thereby preventing operation of the loader.

Other advantages and meritorious features of the operator restraint system of the present invention will be more fully understood from the following description of the invention, the appended claims, and the drawings, a brief description of which follows.

BRIEF DESCRIPTION OF DRAWINGS

FIG. 8 is a top plan view of the restraint arm assembly shown in FIG. 7.

FIG. 9 is a front view of the restraint arm assembly shown in FIG. 8.

FIG. 10 is an assembly view of the restraint arm assembly shown in FIG. 7.

DETAILED DESCRIPTION OF THE INVENTION

Figure 1:
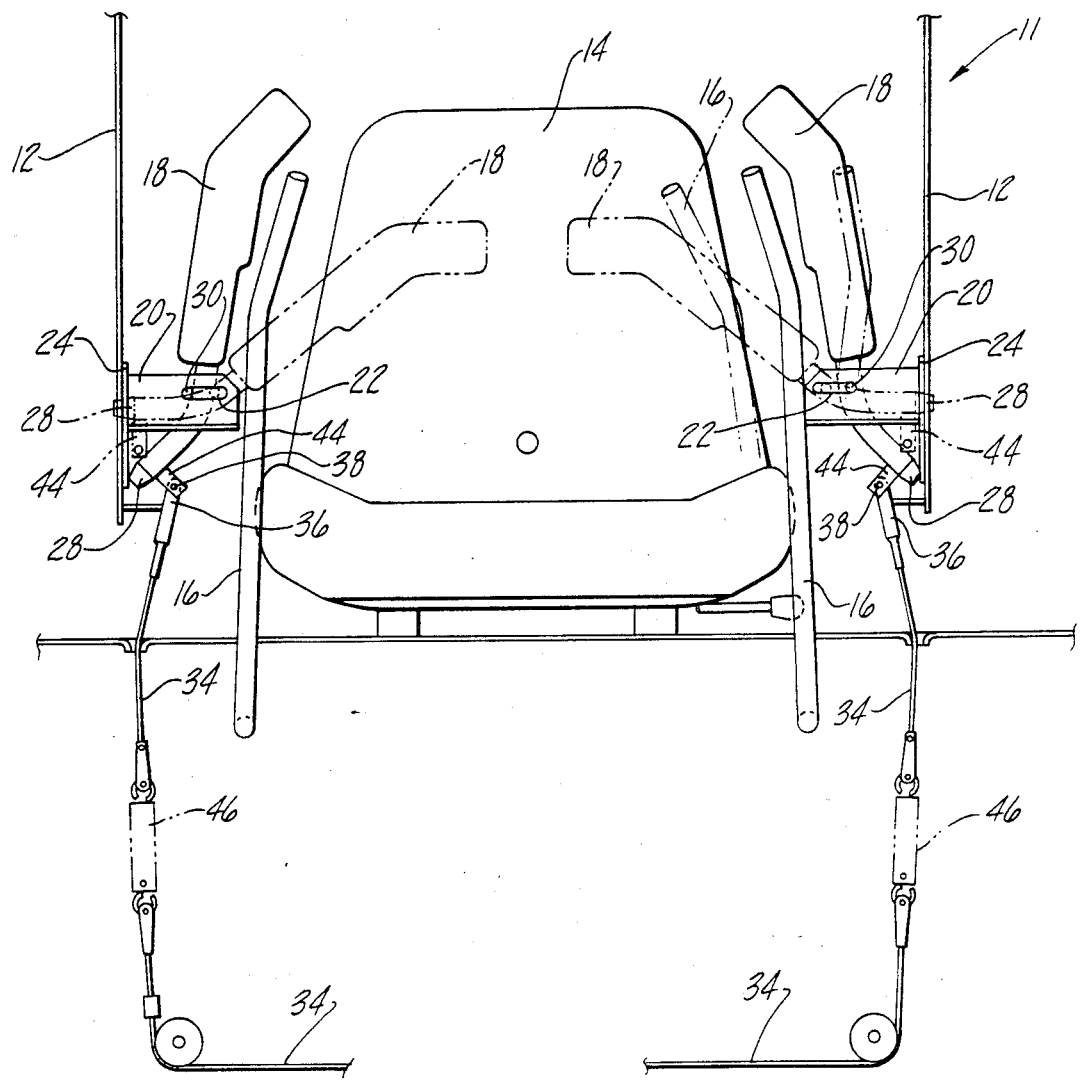
FIG. 1 is a partial front view of a skid steer loader operator's station illustrating the operator restraint system of the present invention.
Figure 2:
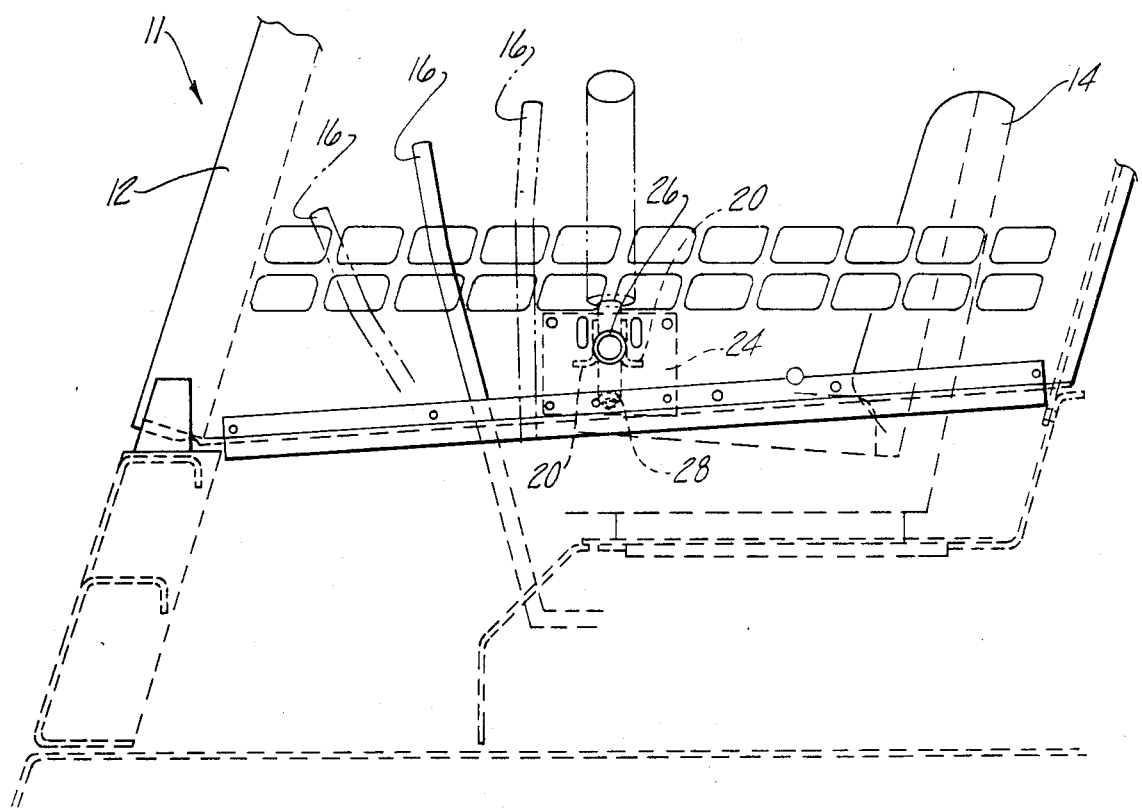
FIG. 2 is a side elevational view of the operator's station illustrated in FIG. 1.

The present invention is illustrated in connection with a skid steer loader 11 which is only partially and schematically illustrated in FIGS. 1-10. As is conventional, loader 11 includes a roll over protection device or cab 12 and an operator's seat 14 that is provided inside cab 12. Loader 11 also includes control levers or handles 16 in front of the operator's seat for permitting the operator to control the movements of the skid steel loader 11.

Referring now in more detail to the drawings, the present invention is directed to a passive restraint system which is used to supplement conventional seat belts in providing operator restraint. The restraint system includes as its basic component a pair of opposed pivotal restraint arms 18 which must be pivoted downwardly to a position such as shown in phantom lines in FIG. 1 before the operator can have access to the control levers 16. Further, as will be described, if arms 18 are not locked into their restraint position, the operator will be unable to operate skid steer loader 11. When the operator is not seated, the restraint arms 18 assume a relatively vertical inoperative position as shown in the solid lines in FIG. 1 and phantom lines in FIGS. 3 and 9.

The restraint arms may be pivotally mounted in several ways as illustrated in FIGS. 1-4, FIGS. 5-6 and FIGS. 7-10.

Referring first to FIGS. 1-4, one end of each restraint arm 18 is pivotally mounted between spaced apart brackets 20 having elongated slots 22 therein. Brackets 20 are mounted to a slide plate 24 on cab 12 with slide plate 24 including an opening 26 for receiving a tapered end 28 of a respective restraint arm 18. An elongated pin 30 is provided for pivotally securing each arm 18 between brackets 20. Pin 30 extends through opening 32 (FIG. 4) in arm 18 and is slidably movable along elongated slots 22. A park latch cable 34 having a bifurcated head portion 36 is attached to each restraint arm 18 by means of a pin 38 which passes through opening 40 (FIG. 4) in head portion 36 and opening 42 (FIG. 4) in restraint arm tab 44.

Figures 3, 4:
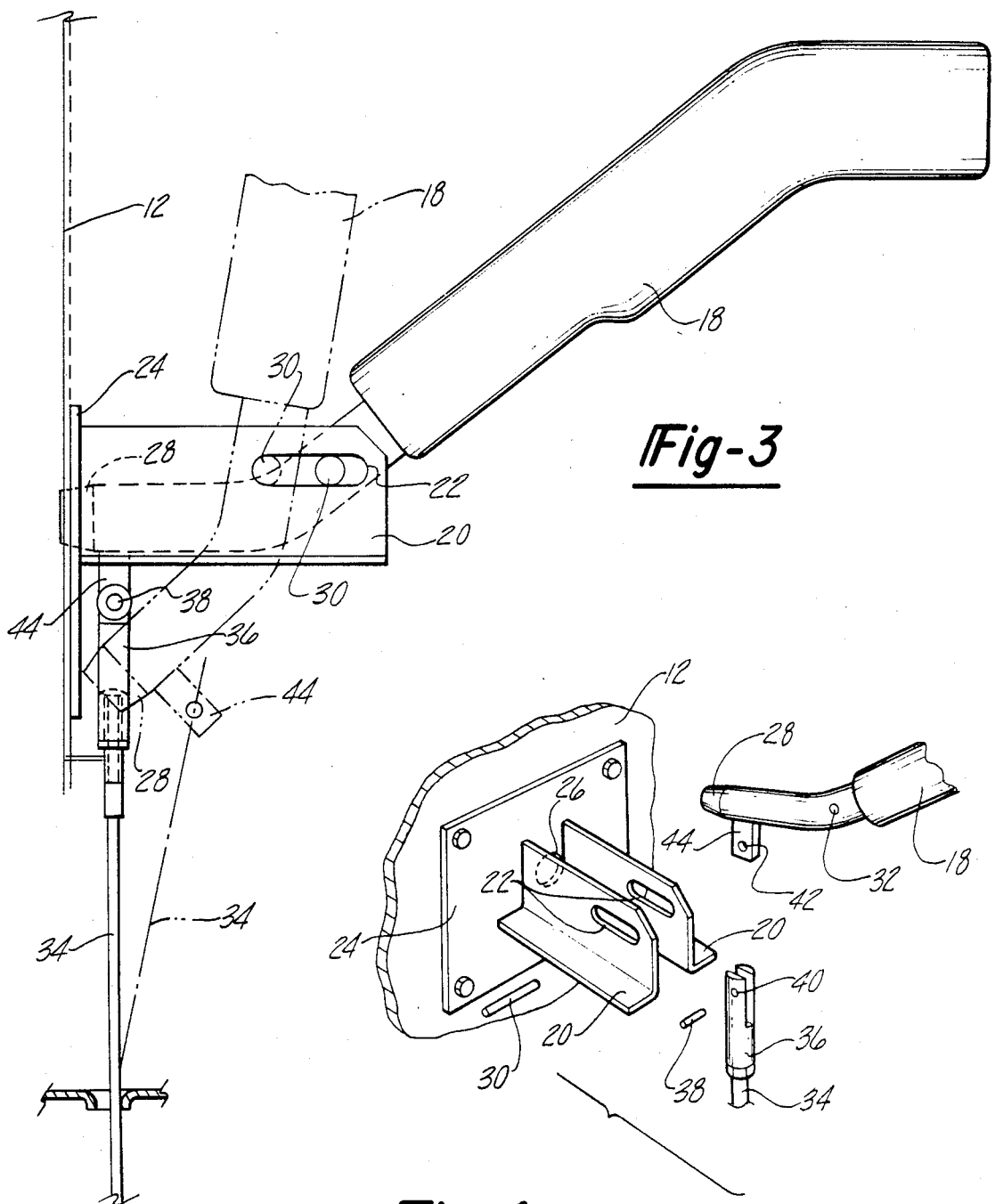
FIG. 3 is an enlarged detail front view of the pivotal connected for a restraint arm.
FIG. 4 is an assembly view of the pivotal connection for the restraint arm shown in FIG. 3.

As shown in FIG. 1, tension springs 46 are provided along the length of park latch cable 34 for biasing restraint arms 18 toward a relatively vertical position as shown in solid lines in FIG. 1 and phantom lines in FIG. 3. In operation, the operator pulls downwardly on the free ends of restraint arms 18 after he is seated which causes the arms to pivot and simultaneously move linearly along elongated slots 22 in brackets 20. Arm ends 28 are tapered so that they will freely slide on plates 24 during pivotal arm movement until the tapered ends 28 are received within openings 26 in plates 24. Thereafter, the bias of springs 46 causes arms 18 to remain securely stationed in their restraint position as shown in phantom lines in FIG. 1 and solid lines in FIG. 3 until the operator releases them. Arms 18 are released by a lateral pulling action which disengages ends 28 from openings 26 thereby permitting springs 46 to pivot arms 18 back to their relatively vertical inoperative position.

Park latch cable 34 is connected to a parking brake assembly (not shown) in a manner similar to that disclosed in U.S. Pat. No. 4,366,881, assigned to the present assignee, which is incorporated herein by reference. Thus, when restraint arms 18 are in a generally vertical inoperative position, a parking brake (not shown) is automatically engaged thereby making loader 11 inoperative.

Figure 5:
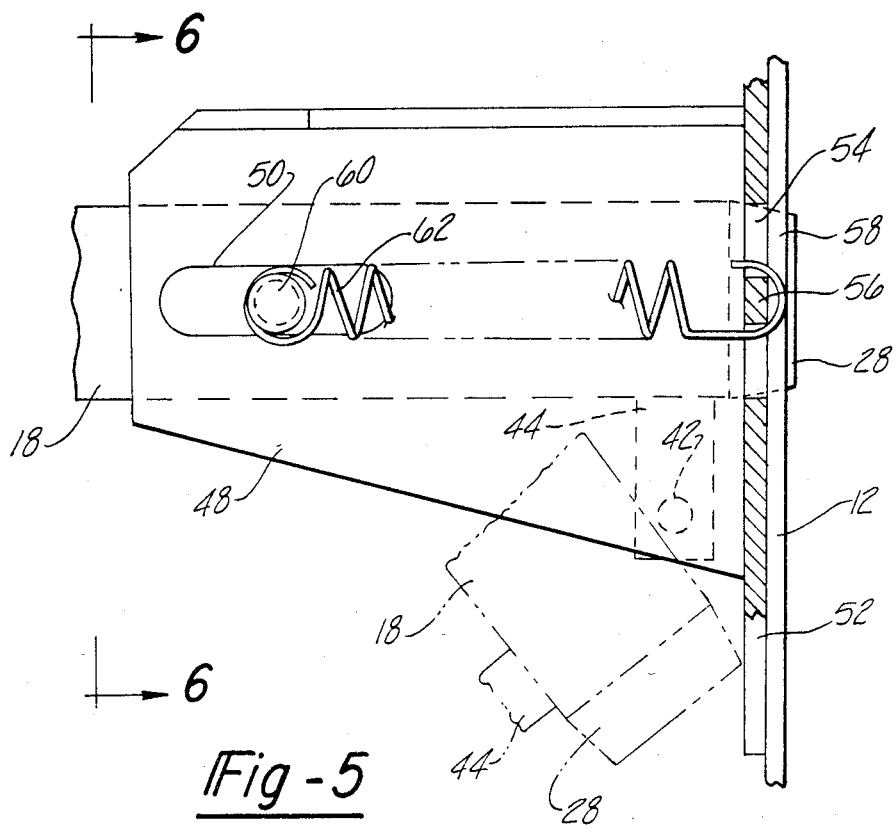
FIG. 5 is an enlarged detail side view of a modified arrangement for pivotally mounted the restraint arm.
Figure 6:
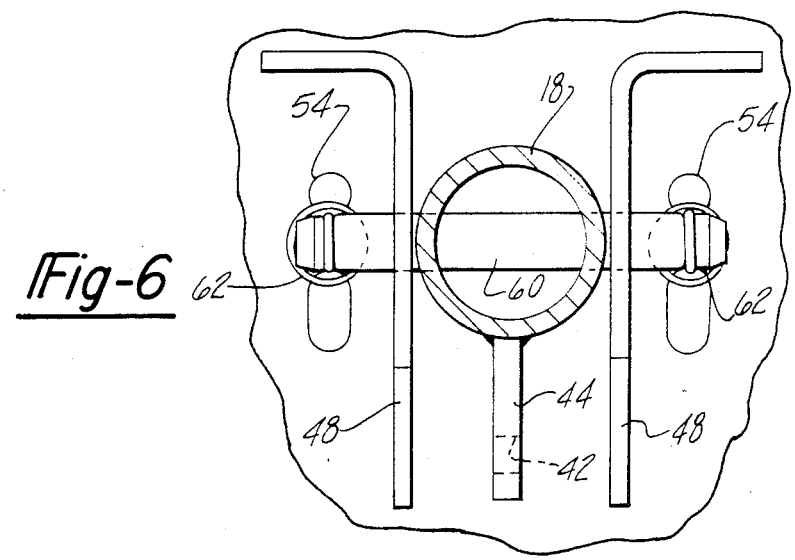
FIG. 6 is a view taken along line 6—6 in FIG. 5.

FIGS. 5-6 illustrate a modified arrangement for biasing the individual restraint arms 18. Each restraint arm 18 is again pivotally mounted between spaced apart brackets 48 having elongated slots 50 therein. Brackets 48 are mounted to a slide plate 52 which includes opposed openings 54 having an intermediate mounting tab portion 56 within each opening. Plate 52 is attached to a side wall of cab 12 which also includes openings 58 coincident with side plate openings 54. The slide plate 52 and side wall of cab 12 each include an opening for receiving the tapered end 28 of arm 18 as previously described. An elongated pin 60 is provided for pivotally securing each arm 18 between brackets 48 as before. Pin 60 extends through arm 18 and is slidably movable along elongated slots 50. Springs 62 are connected between the ends of pin 60 and mounting tab portions 56 for biasing restraint arm 18.

In operation, the operator pulls downwardly on the free ends of restraint arms 18 (FIG. 1) after he is seated which causes the arms to pivot and simultaneously move linearly along elongated slots 50 against the bias of springs 62. During the pivotal movement of arms 18, each of the tapered ends 28 of arms 18 are finally received within an opening through plate 52 and cab 2 as shown in FIG. 5. The bias of springs 62 causes arms 18 to remain securely stationed in their restraint position until the operator releases them. Further, after arms 18 are released, springs 62 return arms 18 to their generally vertical inoperative position.

Referring now to FIGS. 7-10, another arrangement for pivotally mounting and securing restraint arms 18 is illustrated. As shown in FIG. 10, restraint arm 18 is secured to a plate 70 which is pivotally attached to bracket 72 by means of fastener 74 that passes through opening 76 (FIG. 10) in plate 70 and opening 78 (FIG. 10) in bracket 72. A hand operated latch 80 is pivotally attached to bracket 72 by fastener 82 which passes through opening 84 (FIG. 10) in latch 80 and opening 86 (FIG. 10) in bracket 72. Latch 80 includes a projecting stop portion 88 which is movable through opening 90 (FIG. 10) in bracket 72. Further, latch 80 is biased by spring 92 for urging stop portion 88 to extend through bracket opening 90. Spring 92 includes a first leg 94 (FIGS. 8 and 10) which engages a side edge of bracket 72 and a second leg 96 (FIGS. 8 and 10) which is received within opening 98 (FIG. 10) in latch 80.

Figure 7:
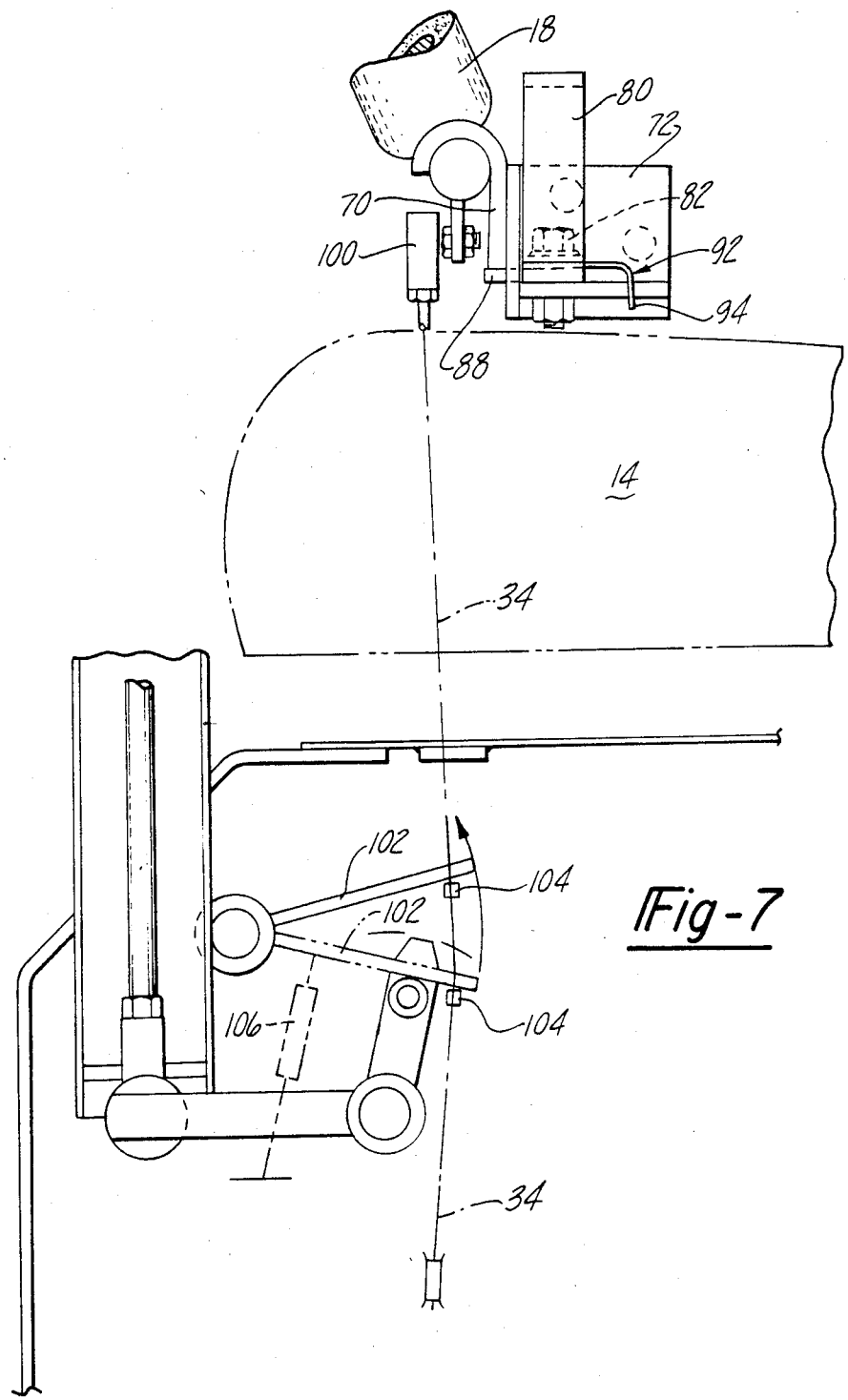
FIG. 7 is an enlarged side elevational view of another arrangement for the operator restraint system.

The arrangement shown in FIGS. 7–10 also includes a park latch cable 34 which is connected to each pivotal restraint arm 18 by means of coupling 100. Cable 34 extends through a pivotal loader control lock 102 and is connected to a parking brake assembly (not shown) as previously described. A stop 104 on cable 34 causes lock 102 to pivot upwardly to an "off" position as shown in FIG. 7 when restraint arm 18 is in its restraint position as shown in FIG. 7. When restraint arm 18 is released from its restraint position, a spring 106 (FIG. 7) connected to lock 102 and the tension in cable 34 returns lock 102 to an "on" position as shown in dotted lines in FIG. 7 and simultaneously returns restraint arm 18 to a generally vertical inoperative position as shown in phantom lines in FIG. 9.

In operation, when restraint arm 18 is in a generally vertical inoperative position as shown in phantom lines in FIG. 9, plate 90 prevents the spring biased stop portion 88 from extending through bracket opening 90. After the operator is seated, he rotates restraint arm 18 to a position as shown in FIG. 7 which permits stop portion 88 to extend through bracket opening 90 and into blocking engagement with an end of restraint arm plate 70. Thereafter, restraint arm 18 cannot rotate back to its generally vertical inoperative position until hand operated latch 80 is rotated by the operator to release stop portion 88 from engagement with restraint arm plate 70. When stop portion 88 is disengaged, the tension in cable 34 and the coaction between spring 106, lock 102 and stop 104 causes restraint arm 18 to be returned to its generally vertical inoperative position.

As described, when restraint arm 18 is rotated to its operative position as shown in FIG. 7, the pivotal loader control lock 102 is lifted to an "off" position which permits operation of loader 11. Simultaneously, park latch cable 34 disengages a parking latch pin (not shown) in a drive sprocket (not shown) which allows the loader wheels (not shown) to rotate. If the operator retracts latch 80 to disengage stop portion 88 from restraint arm plate 70, then the tension in cable 34 and force from spring 106 rotates restraint arm 18 to a generally vertical inoperative position which causes lock 102 to rotate to an "on" position (dotted lines, FIG. 7) and the parking lotch pin (not shown) to be reengaged with the drive sprocket (not shown) thereby preventing operation of loader 11.

It will be apparent to those skilled in the art that the foregoing disclosure is exemplary in nature rather than limiting, the invention being limited only by the appended claims.

We claim:

1. An operator restraint system for a loader having an operator's seat, control handles in front of said seat, and a cab surrounding said operator's seat, said restraint system comprising:

at least one restraint arm pivotally connected to said cab, means for pivotally mounting one end of said restraint arm between spaced apart brackets having opposed elongated slots therein, said brackets mounted to a planar means with said planar means including an opening for receiving said one end of said arm, said one arm end being adapted to engage and slide along said planar means, and said mounting means being slidably movable along said slots during rotational movement of said arm;

means for biasing said arm toward a generally vertical inoperative position and cable means connecting said one arm end to lock means which is engaged for making said loader inoperable when said arm is in its inoperative position; and said arm being rotatable from said inoperative position to an operative position wherein said one arm end is received within said planar means opening thereby disengaging said lock means and said biasing means securely holding said arm in said operative position until said arm is released.

2. The operator restraint system as defined in claim 1 wherein said restraint arm being located between said operator's seat and said control handles for obstructing access to the control handles unless said arm is in its operative position.

3. The operator restraint system as defined in claim 1 wherein said biasing means being attached to said cable means.

4. The operator restraint system as defined in claim 1 wherein said biasing means being attached between said mounting means and said planar means.

5. The operator restraint system as defined in claim 1 wherein said one arm end being tapered for permitting engagement and sliding along said planar means.

6. An operator restraint system for a loader having an operator's seat, control handles in front of said seat, and a cab surrounding said operator's seat, said restraint system comprising:

at least one restraint arm pivotally connected to said cab, plate means connected to one end of said restraint arm, said plate means pivotally connected to a bracket having an opening therein, latch means pivotally attached to said bracket and including a stop portion which is movable through said bracket opening, and means for biasing said latch means for urging said stop portion to extend through said bracket opening;

means for biasing said restraint arm toward a generally vertical inoperative position wherein said plate means prevents said stop portion from extending through said bracket opening, and cable means connecting said one arm end to lock means which is engaged for making said loader inoperable when said restraint arm is in its inoperative position; and said restraint arm being rotatable from said inoperative position to an operative position wherein said stop portion extends through said bracket opening into blocking engagement with said plate means thereby disengaging said lock means and preventing said restraint arm from rotating back to its inoperative position until said arm is released by rotating said latch means.

* * * * *